Oct. 11, 1966     G. A. PRELL     3,277,719

DIFFERENTIAL PRESSURE TRANSDUCER

Filed Oct. 14, 1963

INVENTOR:
George A. Prell

By Mueller & Aichele
Attorney

United States Patent Office 3,277,719
Patented Oct. 11, 1966

3,277,719
DIFFERENTIAL PRESSURE TRANSDUCER
George A. Prell, Phoenix, Ariz., assignor to Motorola, Inc., Franklin Park, Ill., a corporation of Illinois
Filed Oct. 14, 1963, Ser. No. 315,821
6 Claims. (Cl. 73—407)

The present invention relates to pressure responsive units, and it relates more particularly to an improved, rugged, fluid-filled type of differential pressure transducer which is very accurate in its operation.

The improved transducer unit of the present invention is capable of responding to pressure differentials, and of providing an electrical output signal representative of such differentials. The unit is of the variable reluctance type, and changes in pressure differential are converted in the unit to changes in electrical inductance ratios, as will be described.

The usual prior art differential pressure transducer includes a casing composed of several parts, and in which corrugated membranes or diaphragms are securely clamped between the parts. These diaphragms extend across the interior of the casing and divide it into separate compartments, or chambers.

The several compartments in the prior art differential pressure transducers are coupled to the source whose pressure differential is to be measured. The resultant force from the source on the internal diaphragms of the transducer causes a movement thereof, and this movement is translated into an output signal. In the differential pressure transducer to be described herein, the movement of a measuring diaphragm is translated inside the assembly to a corresponding inductive ratio change of a pair of inductance coils. Appropriate electrical connections from the coils extend to the exterior of the unit through appropriate hermetic seals. This means that hermetically sealed electric wires are the only connections extending out from the interior of the unit.

The differential pressure transducer to be described herein is a three diaphragm system, in that it includes a measuring diaphragm and two seal diaphragms. The interior of the unit is evacuated and then fluid filled. A silicone fluid is suitable as the filling medium.

In a manner to be described, the seal diaphragms are formed into a corrugated configuration on back-up contours on the capsule body of the transducer after they are welded to the capsule body. The construction of the unit is such that the diaphragms move only a few thousandths of an inch, and they are fluid damped within the sealed fluid system.

In the operation of the usual type of differential pressure transducer, one or the other of the pressure whose differential is to be measured sometimes inadvertently drops to the atmospheric level. This establishes a pressure differential across the transducer which may be many times greater than the normal differentials. For example, a transducer which normally measures pressure differentials of the order of 1 p.s.i. may suddenly be exposed to a pressure differential of the order of 1500 p.s.i.

The instrument of the present invention is constructed in a new and improved manner to withstand such excessive pressure differentials without harm to its diaphragms or any other of its operating components.

For example, although the differential pressure transducer to be described is constructed to measure pressure differentials in a range of from 0–1 p.s.i., it can withstand over-pressures up to 1500 p.s.i. on either its low pressure side or on its high pressure side. Moreover, the transducer to be described responds to such over-pressures with less than 1% zero shift.

When an over-pressure condition occurs, such as described above, the travel of the movable component of the unit of the invention is stopped by the capsule body in the positive direction and by three adjustable set screws in the negative direction. Under these conditions, the measuring diaphragm in the unit continues to deflect until all the fluid between it and one or the other of a pair of seal diaphragms has been transfered to the high or low pressure chambers defined by the measuring diaphragm. Sintered metal filter elements, as will be described, are provided between the chambers defined by the seal diaphragms and the measuring diaphragm chambers, so as to shape the frequency response of the transducer, and to render the unit explosion proof.

The short diaphragm travel in the transducer of the present invention, and the fluid dampening, renders the assembly essentially immune to the usual adverse effects of external shock and vibrations. Moreover, the short diaphragm travel of the unit minimizes mechanical hysteresis and increases its response speed. In addition, essentially constant effective diaphragm area is maintained due to the short travel which contributes to linearity characteristics in the overall transducer system.

The embodiment of the invention to be described incorporates a self-contained, temperature-compensated, variable-reluctance, force-measuring cell. This cell measures the force generated by the measuring diaphragm. It includes a machined, cylindrical-shaped spring housing member; and magnetic cores, inductance coils, and a movable armature are mounted within the housing member.

The machined spring housing member may be composed, for example, of a nickel alloy known as Ni-Span C. This material has a constant spring rate over a wide temperature range. However, it is evident that any other suitable resilient material exhibiting desired temperature characteristics may be used. Temperature compensation is achieved in the cell by supporting the armature and cores with identical lengths of supporting strips, the strips being composed of the same material as the cylindrical spring member.

An object of the present invention, therefore, is to provide an improved, simplified, rugged transducer of the pressure differential type, which is extremely accurate and precise in its operation, and yet which is compact in size and light in weight.

Another object of the invention is to provide such an improved differential pressure transducer which is capable of withstanding large over-pressure conditions.

Yet another object of the invention is to provide such an improved pressure differential transducer which is immune, for all practical purposes, to the adverse effects of external shocks and vibrations.

A still further object of the invention is to provide such an improved transducer which is essentially linear in its characteristics.

Other objects and advantages of the invention will become apparent from a consideration of the following description, when the description is considered in conjunction with the accompanying drawings, in which.

Figure 1:
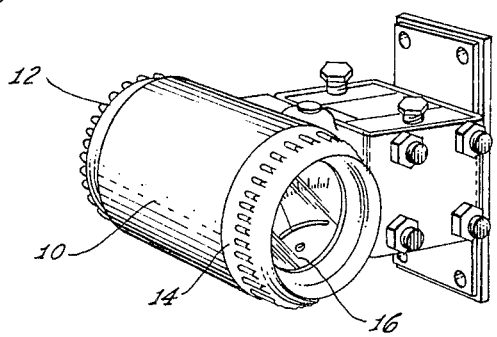
FIGURE 1 is a perspective view of one embodiment of the invention, in which the pressure differential transducer is mounted in a housing suitable, for example, for use to measure the rate of flow of a fluid.

The embodiment of the invention shown in FIGURE 1 includes, for example, a cylindrical capsule casing 10. The casing 10 includes a connection flange 12 at one end, and a connection flange 14 at the other end. The connection flanges provide passageways into the interior of the housing 10, so that differential pressures from any appropriate source may be introduced to the transducer unit.

In the particular embodiment of FIGURE 1, for example, the unit is intended to be used in conjunction with a liquid or gas carrying pipeline. An orifice is provided in the pipe line, and the unit of FIGURE 1 measures the differential pressures on opposite sides of the orifice. These pressures are a measure of the rate of the flow of the fluid in the pipe line; and a meter 16 may be mounted at one end of the unit, the meter being calibrated directly into "rate of flow."

Figure 2:
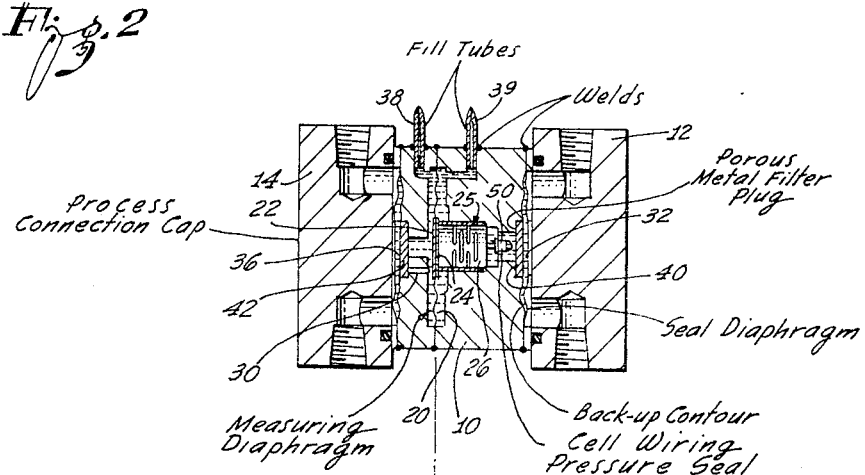
FIGURE 2 is a sectional view of the unit shown in FIGURE 1.

As shown in FIGURE 2, the casing 10 supports a measuring diaphragm 20 which extends across the interior of the casing. The measuring diaphragm 20 divides the inner chamber into a first, or high pressure, chamber or compartment; and into a second, or low pressure, chamber or compartment.

The measuring diaphragm 20 may be formed, for example, of beryllium copper, stainless steel, or other appropriate resilient material. A pair of stiffener discs 22 and 24 are attached to the center of the measuring diaphragm 20, on opposite sides thereof. These discs serve as a central stiffener means for the measuring diaphragm. They may be attached to the diaphragm by an epoxy adhesive, or other appropriate means.

A self-contained, temperature-compensated, variable-reluctance, force-measuring cell 25, which will be described in more detail subsequently, is positioned in one of the two compartments defined by the measuring diaphragm 20. The cell 25, as will be explained in conjunction with FIGURE 3, includes a cylindrical shaped resilient spring housing member 26.

Figure 3:
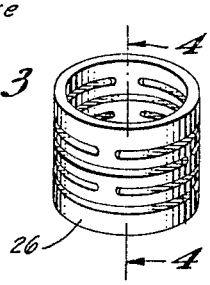
FIGURE 3 is an enlarged perspective view of an internal measuring cell which is self-contained, and which is incorporated in the transducer of FIGURES 1 and 2.

The spring member 26 has slots machined in it, so that it may exhibit resilient characteristics in a longitudinal direction. These slots overlap one another, as shown in FIGURE 3, so that each section of the spring member bends, so as to achieve the desired resilient characteristics. The spring member 26 is preferably formed of a resilient alloy, such as Ni-Span C alloy, as mentioned above. This alloy is satisfactory, as explained, because it exhibits a constant spring rate with temperature change.

The spring member 26 of the transducer cell 25 is supported in the low-pressure compartment of the capsule with its right hand end abutting a shoulder formed in the capsule casing 10. The left hand end of the cylindrical spring member is mechanically coupled to the measuring diaphragm 20, by securing it to the stiffening plate 24 by means of an epoxy seal, or by other suitable adhesive means.

The stiffener disc 24 is also sealed to the end of the spring element 26, and it constitutes an end member for the transducer cell 25. The stiffener disc 24 extends radially beyond the peripheral edge of the cylindrical spring member 26; and the corresponding edge of the capsule casing 10 constitutes a stop member for the transducer cell, in that it limits the movement of the left hand end of the cell in its travel to the right in FIGURE 2. An adjustable screw 30 is threaded through the casing 10, and this screw engages the stiffener member 22, so as to limit the travel of the left hand end of the transducer cell 25 to the left in FIGURE 2.

The construction described in the preceding paragraph protects the cell 25 from over-pressure, in that the cell is permitted to compress just so far, at which time the stiffener member 24 abuts against the capsule casing 10. Likewise, the cell is permitted to expand just so far, at which time the stiffener member 22 abuts against the adjustable screw 30.

The transducer unit of the invention also includes a pair of seal diaphragms 32 and 36. The seal diaphragms are supported in the casing 10, and they enclose the outer ends of the high- and low-pressure compartments formed by the measuring diaphragm 20. Therefore, the measuring diaphragm 20 and the seal diaphragm 32 cooperate to provide the low-pressure compartment in the capsule casing 10. Likewise, the measuring diaphragm 20 and the seal diaphragm 36 cooperate to form the high-pressure compartment in the casing 10.

Both the low-pressure compartment and the high-pressure compartment of the transducer are filled with an appropriate filler fluid. This fluid transmits the differential pressure from the seal diaphragms to the measuring diaphragms, while protecting the unit against shock and vibration. The seal diaphragms prevent the fluid from the differential pressure source from entering the interior of the unit; the latter fluid being introduced to the external surfaces of the respective seal diaphragms 32 and 36 by the connection flanges 12 and 14.

The high-pressure compartment and the low-pressure compartment with the capsule casing 10 are evacuated and completely filled with the filler fluid through the respective tubes 38 and 39. The filler fluid is introduced into the high- and low-pressure chambers through these tubes, and the tubes are then pinched off and welded. A suitable filler fluid for the purpose is Dow Corning silicone fluid. The filler fluid volume in the high- and low-pressure compartments must be equal, or else differential expansion problems arise with changes in ambient temperature.

Each of the seal diaphragms 32 and 36 includes an inner and an outer membrane, and these membranes define an enclosed chamber in each of the seal diaphragms. A metal filter plug 40 is positioned on the inner membrane of the seal diaphragm 32, and a similar plug 42 is positioned on the inner membrane of the seal diaphragm 36. These filter plugs are formed, for example, of a sintered bronze porous element, and they permit the filler fluid to flow in and out of the chambers defined in the seal diaphragms 32 and 36, but at a controlled rate.

As shown in FIGURE 2, the capsule casing 10 provides a back-up surface for each of the seal diaphragms 32 and 36, and this surface has contours which mate with the contours of the seal diaphragms. The seal diaphragms, like the measuring diaphragms, may be formed of stainless steel, beryllium copper, or other suitable resilient material.

The seal diaphragms 32 and 36 are seam welded to the capsule casing 10. These diaphragms are preformed, so that they bulge out slightly, and they are then formed by pressing them into a contoured shape against the contours in the back-up surfaces of the capsule casing 10. This forming may be carried out, for example, at a pressure of 3000 p.s.i., so that the contours of the seal diaphragms match exactly the contours machined into the back-up surfaces of the capsule casing 10.

For an over-pressure condition, which arises (as mentioned above) when one of the two pressures whose differential is to be measured drops to atmospheric, the left hand of the cell 25 is moved in one direction or the other until it is stopped, either by the edge of the casing 10 or by the adjustable stop 30. Then, one or the other of the seal diaphragms is moved against the corresponding back-up surface of the casing 10. When either one of the seal diaphragms is so moved against the back-up surface, the fluid in its inner chamber is forced out through the corresponding porous filter plug 40 or 42. After that has occurred, the particular seal diaphragm "bottoms out" and is flattened against its back-up surface on the capsule casing, thus preventing damage to the measuring diaphragm at all pressures up to the static limit of the unit.

The porous sintered filter plugs 40 and 42, which are places between the seal diaphragms and the measuring diaphragm, also serve to control the frequency response of the unit, as noted previously herein.

During normal operation of the transducer unit, the movement of the measuring diaphragm 20 is negligible; of the order of .0075 inch in a constructed embodiment, for example. This assures a constant effective area with resulting high degree of linearity. The measuring cell 25 is mounted in the center of the unit, as explained above. The elecetric leads from the measuring transducer cell are brought up through high pressure hermetically sealed seals, such as the seal 50. This is the only external coupling of the unit; and no mechanically moving levers, or other devices are used.

Figure 4:
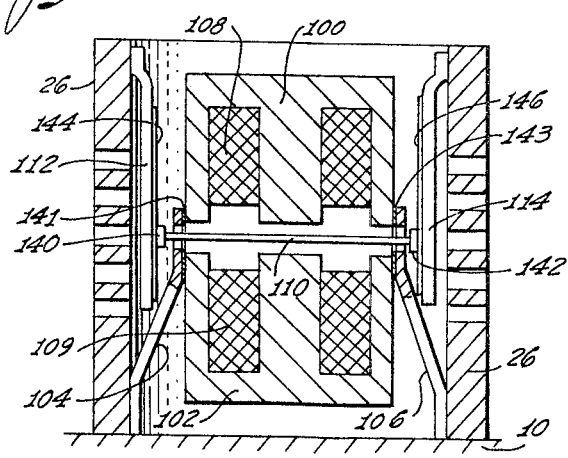
FIGURE 4 is an enlarged sectional view of the pressure cell of FIGURE 3.

The transducer cell itself, as shown in FIGURES 3 and 4, and as explained above, includes a resilient cylindrical spring housing member 26. As shown in FIGURE 4, a pair of magnetic cores 100, and 102 are supported within the cylindrical spring member 26. These magnetic cores may, for example, be composed of a ferrite material. The cores 100 and 102 are supported within the spring member 26 by means of a plurality of supporting strip members 104 and 106. These strip members are preferably formed of the same material as the cylindrical spring member 26, so that the characteristics of the unit may be independent of changes in ambient temperature.

A pair of coils 108 and 109 are supported on the respective cores 100 and 102. A magnetic armature 110 is supported by a pair of strip members 112 and 114 in the manner illustrated in FIGURE 2. The strip members 112 and 114 may be composed of the same material as the spring member 26, so as to render the cell independent of changes in ambient temperature. The armature 110 is composed of a suitable magnetic material, such as a ferrite material.

The armature 110 is supported, so that when the movable end of the spring member 26 is moved back and forth, in a longitudinal direction, the armature changes the air gaps between the cores 100 and 102. This provides a corresponding change in the inductance ratio of the coils 108 and 109; and this inductance ratio is used in a suitable electric circuit, to indicate the amount of movement of the upper end of the spring member 26.

The armature 110 is mounted on the strip members 112 and 114 by a pair of members 140 and 142 of a material capable of providing magnetic insulation between the armature 110 and the strip members. The members 140 and 142 may, for example, be ceramic discs.

In addition, magnetic shields may be provided between the strip members 112 and 114 and the magnetic cores 100 and 102, these magnetic shields being in the form of strips 144 and 146 secured to the inner surfaces of respective ones of the supporting strip members 112 and 114. The magnetic shielding strips 144 and 146 may be composed of suitable magnetic shielding material. For example, many nickel alloys are appropriate for this purpose.

The transducer cell 25 constitutes a self-contained force-to-inductance ratio transducer. The cell accurately measures any force applied between its two ends, and it is highly linear over its entire travel range. Moreover, the transducer cell 25 is extremely stable with temperature.

As mentioned above, the force-to-motion portion of the cell 25 is the machine spring cylinder 25 of Ni-Span C alloy, or other suitable material. The material for the spring member 25 is chosen for its constant spring rate with changes in ambient temperature, and for its extremely low mechanical hysteresis. A very wide selection of force ranges may be realized in the design of the spring member 26, merely by changing the pattern of the machined slots in the member.

The motion-to-inductance ratio portion of the cell 25 consists of the armature 110 positioned between the two magnetic cores 100 and 102. The cores 100 and 102 are attached to the stationary bottom end of the spring member 26, by means of the support strips 104, 106; while the armature 110 is attached to the movable top end of the spring member 26, by means of the support strips 112 and 114, as described. Magnetic insulating members 141 and 143 may be interposed between the cores 100, 102 and the supporting strips 104, 106. These members 141 and 143 may be in the form of ceramic discs, or other suitable material for providing magnetic insulation for the cores.

As noted above, the application of force to the top of the spring member 26 causes the armature to decrease the air gap of one of the cores 100, 102, and increase the air gap of the other core. This gap change causes a predictable and substantially linear change in the inductance ratio of the coils 108 and 110. This change in the inductance ratio is utilized in an appropriate electrical circuit, to provide the desired indications.

The invention provides, therefore, an improved differential pressure transducer which is highly accurate and linear in its response. Moreover, the improved unit of the present invention is extremely rugged in its construction; and it is capable of withstanding over-pressure conditions of many times the normal pressure differentials with which it is intended to operate.

While a particular embodiment of the invention has been shown and described, modifications may be made, and it is intended in the claims to cover the modifications which fall within the spirit and scope of the invention.

What is claimed is:

1. A fluid-type differential pressure responsive unit including in combination: a hollow casing defining an internal chamber for the unit; a flexible measuring diaphragm mounted in said casing and separating the internal chamber into two fluid-containing compartments hermetically sealed from one another; a transducer cell positioned in one of said compartments, a cylindrical-shaped longitudinal resilient element having one end supported by said casing and a second end mechanically coupled to said measuring diaphragm; first and second seal diaphragms respectively enclosing the sides of said compartments remote from said measuring diaphragm; and means for introducing the differential pressures to be measured to the external sides of said seal diaphragms; said transducer cell including said cylindrical-shaped longitudinally-resilient element, a pair of magnetic cores supported in said cylindrical-shaped resilient element, a pair of inductance coils wound on respective ones of said cores, and an armature supported in said cylindrical-shaped resilient element to provide varying air gaps with respect to said cores upon movement of said second end of said resilient element.

2. The unit defined in claim 1 in which said resilient element is a metallic element slotted to exhibit resilient characteristics in a longitudinal direction.

3. The unit defined in claim 1 in which said cores and said armature are supported in said resilient element by support members of the same material as said resilient element to eliminate adverse effects of expansion due to ambient temperature change.

4. The unit defined in claim 1 in which said seal diaphragms are contoured, and in which said casing provides a back-up surface for said seal diaphragms, said back-up surface having contours mating with the contours of the corresponding ones of said seal diaphragms.

5. The unit defined in claim 1 in which said second end of said cell extends radially beyond the remaining portion thereof, and in which said casing serves as a limiting stop for said second end in one direction of travel thereof.

6. The unit defined in claim 5 and which includes an adjustable stop member for limiting the travel of said second end of said cell in the opposite direction.

(References on following page)

References Cited by the Examiner

UNITED STATES PATENTS

| | | | |
|---|---|---|---|
| 2,260,036 | 10/1941 | Kuehni | 73—88.5 X |
| 2,276,580 | 3/1942 | Hofer | 73—398 X |
| 2,627,750 | 2/1953 | Titus | 73—407 |
| 2,699,134 | 1/1955 | Maxwell | 113—116 |
| 2,752,949 | 6/1956 | Jones | 73—406 X |
| 2,841,984 | 7/1958 | Green | 73—406 X |
| 2,903,663 | 9/1959 | Collina | 336—134 |
| 2,981,912 | 4/1961 | Giovanni | 73—398 X |
| 3,005,969 | 10/1961 | Wysocki | 336—134 |
| 3,106,095 | 10/1963 | Tavis | 73—407 |
| 3,162,795 | 12/1964 | Cherniak | 73—398 X |
| 3,170,429 | 2/1965 | Hock | 113—116 |
| 3,195,353 | 7/1965 | Pien | 73—398 |

FOREIGN PATENTS 552,681  2/1958  Canada.

LOUIS R. PRINCE, *Primary Examiner.*

DONALD O. WOODIEL, *Assistant Examiner.*